United States Patent Office 2,868,494
Patented Jan. 13, 1959

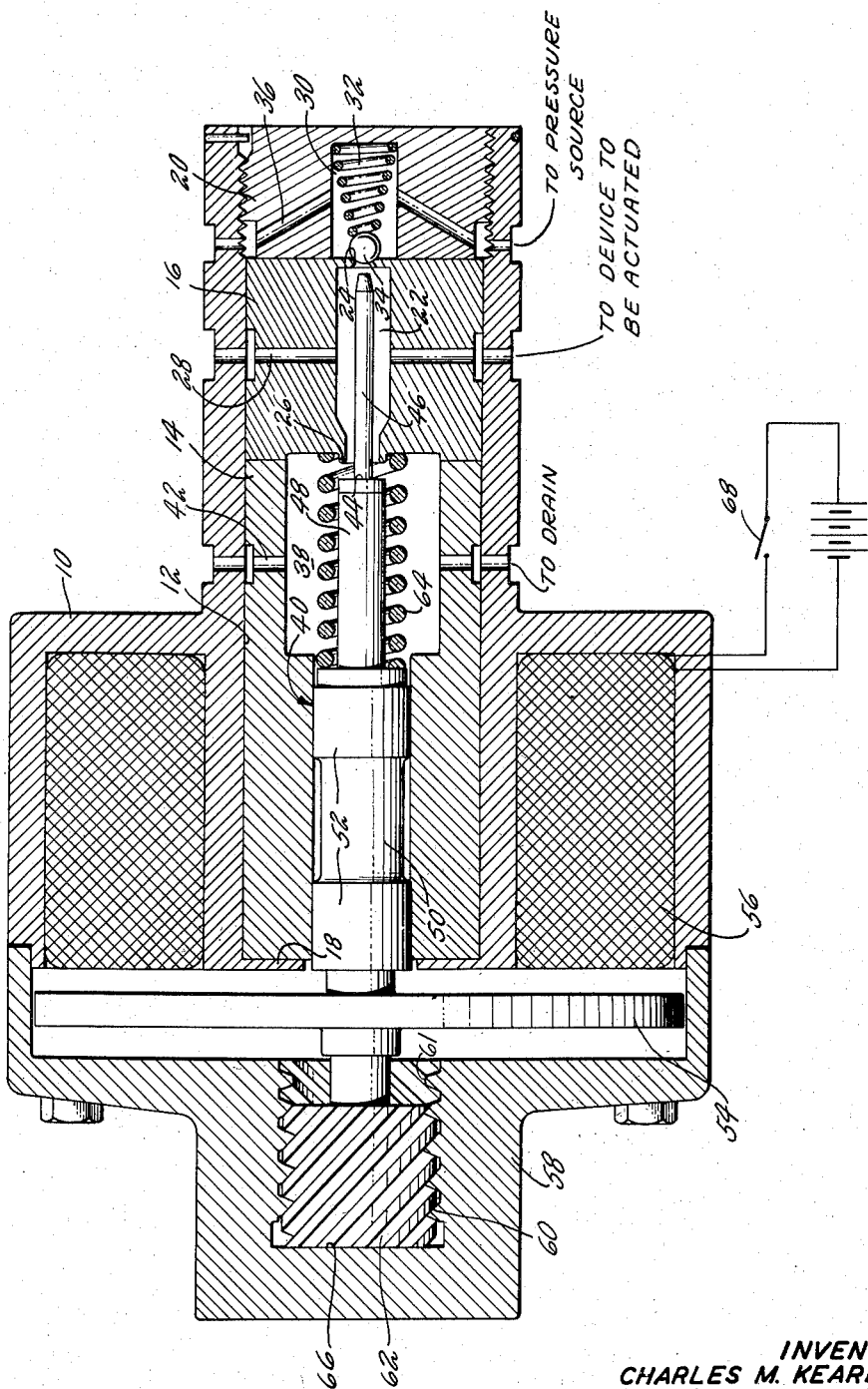

2,868,494

ANTI-VIBRATING SOLENOID VALVE

Charles M. Kearns, Jr., Weathersfield, and William H. Habicht, Windsor, Conn., assignors to United Aircraft Corporation, East Hartford, Conn., a corporation of Delaware Application August 26, 1954, Serial No. 452,438

6 Claims. (Cl. 251—64)

This invention relates to vibration damping means and particularly to means for damping vibrations in a solenoid-actuated, valve-actuating, armature while not materially affecting the operation of the armature by the solenoid.

An object of this invention is to reduce the amplitude of vibration of a spring-pressed armature in its resonant frequency band.

A further object is to limit the amplitude of the vibration-induced movement of a solenoid armature without materially adversely affecting the operation of the armature by the solenoid.

A still further object is to provide in a valve with a valve-closing member spring-pressed to closed position and having an axially movable plunger for moving said member to open position, a simple light mechanism for damping the plunger vibration and preventing opening of the valve by the vibration induced motion of the plunger.

A further object is a friction damper in the form of a spiral gear or splined member on an axially-movable valve-actuating plunger.

These and other objects will be apparent from the following specification and the attached drawings in which:

The figure is a longitudinal cross section through a valve incorporating the invention.

A valve on which the present valve is an improvement is shown in Patent No. 2,809,702, issued October 15, 1957 to Lambeck and Pond in a propeller pitch control system in which it will be noted that inadvertent operation of the valve either as a decrease pitch valve or an increase pitch valve will cause serious malfunctioning of the airplane propeller, such as disabling the governor and forcing the propeller toward high or low pitch position at a time when such action is not desired. An object of the present invention is to eliminate or reduce such inadvertent operation.

The governors or airplane propeller controls in which these valves are employed are usually mounted directly on the engine and are, therefore, subject to the engine vibrations. The valve actuating portion or plunger of the valve has a resonant frequency band which although not a sharp resonant frequency still carries the features of resonance so as to give the valve actuating member a comparatively large amplitude for relatively small repetitive forces within the frequency band. Because of this feature certain frequencies under certain conditions could produce sufficient motion of the valve actuating plunger to open the valve which would result in malfunctioning of the controls. In order to overcome this undesired feature without resorting to additional electrical controls or mechanical controls, such as brakes or stops with their added complications and weight, applicants have devised the structure explained hereinafter for reducing the vibrating motion of the plunger without materially interfering with the actuation of the plunger by the control mechanism which in the example shown is an electric solenoid. In applicants' device the armature or plunger has a comparatively large disc attached thereto on which the solenoid acts. Mechanism is provided in the form of a spiral spline to impart rotary movement to the plunger and its attached disc incident to longitudinal movement of the plunger and disc. Because of the spiral spline connection, the kinetic energy associated with motion of the plunger includes not only the kinetic energy of the plunger mass as a result of its axial velocity in any vibratory motion but also the rotational kinetic energy of the disc necessitated by relative motion between plunger and casing. By suitable design of disc and splines it is possible to require a much larger amount of kinetic energy to be stored as a result of plunger relative motion than would occur with simple axial motion, thus increasing the effective inertia of the plunger in vibratory motion without materially adding to the actual weight of the assembly. The spiral spline connection in addition provides friction damping and because of the tolerances in the spline connections also provides impact damping all of which will dissipate energy and thus reduce the amplitude of the armature movement at any selected vibration acceleration. By means of this mechanism applicants have been able to increase the safe operating range from vibratory accelerations in the neighborhood of 10 to 15 $g$ to vibratory accelerations in the neighborhood of 100 $g$.

In the embodiment shown to illustrate the invention, a valve similar to valves 26 and 28 in the above named patent has been chosen. In this valve a casing 10 preferably of magnetic material such as iron or steel is provided with a bore 12 in which sleeves 14 and 16 are positioned by a flange 18 at one end of the bore and a nut 20 at the other end of the bore. Sleeve 16 is provided with an axially extending channel 22 having an inwardly extending flange at one end providing a valve seat 24 and an inwardly extending flange at the other end providing valve seat 26. Fluid lines 28 extend radially outward intermediate the ends of sleeve 16 to provide the fluid passages controlled by the valve. The nut 20 is provided with a recess 30 containing a spring 32 forcing a ball 34 onto the valve seat 24, the ball 34 thus acting as the valve movable element. Radial passages 36 extend outwardly from recess 30 to provide the fluid inlet passages for the valve 34. Sleeve 14 is provided with an axially extending bore 38 a portion of which slideably and rotatably receives the valve actuating plunger 40. Radially extending passages 42 extend from the bore 38 to provide outlet or drain-connected passages controlled by valve 44 coacting with valve seat 26.

Valve actuating plunger 40 comprises an elongated stepped rod having a projection 46 at one end adapted upon axial movement of the plunger 40 to contact ball 34 and move the ball against the action of spring 32 and the fluid pressure from the pressure source to open the valve. In its normal position, however, the projection 46 is spaced from the ball 34 so that the valve 34 is normally closed. The projection 46 projects from a somewhat larger portion 48 of the plunger 40. The cylindrical portion 48 carries at its end adjacent the projection 46 a movable valve member 44 which cooperates with the valve seat 26 to block the fluid lines 28 from the drain lines 42 when the valve 34 is open to admit pressure through the lines 36 into the chamber 22 and fluid lines 28. Casing 10 may be inserted in a suitable bore in an application such as the propeller governor housing to which suitable lines may be led to connect with lines 28, 36 and 42.

The cylindrical portion 43 of plunger 40 extends from a larger portion 50 having guide lands 52 at the opposite ends. These guide lands are a running fit in a portion of the bore 38 of the sleeve 14 and serve to guide the plunger in its axial and rotary movement. The plunger 40 carries a comparatively large diameter flange or disc 54 adjacent the guide portion 50 at the end opposite from the projection 48. The flange 54 overlies annular solenoid coil 56 carried by the casing 10 and surrounding sleeve 14 and plunger 40. Solenoid coil 56 when energized attracts the flange 54 to impart longitudinal movement to the plunger 40. A cap 58 which is preferably of non-magnetic material such as aluminum is secured on casing 10 by any suitable means such as cap screws, and is provided with a spirally splined recess 60 axially aligned with the plunger 40. Internal splines 61 may be formed in an insert secured in cap 58 instead of being integral with the cap as shown. A correspondingly, helically-splined plunger 62 is carried at the end of plunger 40 and cooperates with the splined recess 60 to impart rotational movement to the plunger 40 and the flange 54 upon axial movement of the plunger 40. Due to manufacturing tolerances there is preferably a slight freedom of movement between the splined plunger 62 and the spline recess 60 amounting in some installations to about .010 of an inch.

From the above description it will be apparent that the valve actuating plunger comprises a unitary structure including projection 46, plunger 48, guide plunger 50, flange 54 and the spirally splined plunger 62. This entire assembly is spring-pressed to the left as shown in the figure by spring 64 so that the splined member 62 is forced against a suitable stop, shown as the bottom 66 of recess 60 in cap 58, so that the cap acts as a stop in one direction for the plunger. The casing 10, which is supported directly or indirectly on a vibrating device such as the engine driving the propeller, receives the vibrations from the engine or device and transmits them to the plunger 40 through the spring 64 and also through the stop portion 66 of the cap 58 and the splines of the spline member 62. Tracing out what is now believed to be the probable action in reducing or limiting the amplitude of vibration of the plunger 40 under the effect of vibration forces imparted through the member 10, movement of the casing 10 to the right as shown in the figure will carry with it the plunger 40 because of the contact of the plunger 40 with the stop portion 66 of the cap. At the end of the vibrational movement toward the right end at the beginning of the vibrational movement toward the left of the casing 10 there will first be a slight relative axial movement between the spirally splined portion of the cap 58 and the spirally splined plunger 62 to take up the approximately .010 clearance in the splines which will result in an impact of the spline surfaces as they come together, which impact will produce some damping of vibration of the plunger 40. Continued movement of casing 10 to the left will, through the splines, try to drag the plunger 40 with it and thus force the splined members into frictional contact and also tend to rotate the plunger 40 with its flanged member 54. Any relative longitudinal movement will result in friction along the splined surface which will tend to resist such movement. The relative movement of the casing 10 and plunger 40 is additionally resisted by the inertia of the flange 54 which would have to be rotated incident to any relative longitudinal movement of the casing and the plunger. Thus the inertia of the flange 54 will tend to force the splined surfaces together with a force increasing with increasing vibration acceleration. The plunger will, therefore, follow the casing back quite closely thus materially reducing the amplitude of movement that might otherwise be imparted to the plunger 40.

When the casing 10 arrives at the left-hand extreme of its vibration movement and starts back toward the right the process is again repeated at which the slack in the splines is first taken up resulting in an impact which provides some damping and in friction along the splines incident to any relative movement which will provide some additional damping and in the polar inertia of the member 54 which will tend to force the plunger 40 to follow along with the casing 10 and force the splines into frictional engagement.

Because of the constant urge of the spring 64 tending always to move the plunger 40 to the left it is quite probable that before the casing 10 completes its second movement toward the right that the spline member 62 will contact the bottom 66 in cap 58 and create further damping by the impact between the cap and the spline member. The casing 10 may be filled or partially filled with oil either intentionally or through leakage. Oil forced into and out of splined recess 60 through the clearance between the splined plunger 62 and the splined recess 60 will provide fluid friction damping.

Analyzing the action of the plunger from a somewhat different viewpoint, a very rapid axial oscillation of the casing 10, well above the resonant frequency of the vibrating system, if the plunger were free to move, would have little or no effect on the plunger and the plunger would tend to remain stationary in space while the casing oscillated. In other words the inertia of the plunger would tend to keep it motionless. With the spiral splines in the system however the plunger must be rotated if it does not follow the movement of the casing but such rotary movement is resisted by the rotary inertia of the plunger and the flanged member. Hence although the axial inertia of the plunger will tend to maintain it motionless, the rotary inertia of the plunger and flange will tend to make the plunger follow the motion of the casing. It therefore follows that the rotary inertia reduces the amplitude of relative motion between the casing and the plunger independent of any frictional or impact damping.

From the above description of the operation it is apparent that the mechanism provides impact damping, mechanical friction damping, fluid friction damping and augmentation of inertial forces all of which tends to reduce the amplitude of vibration imparted to the member 40 by virtue of vibration of the casing 10. It has been found that the use of the above-described mechanism with a 45° spiral on the member 62 greatly reduces the amplitude of vibration of the member 40 for the same value of vibration acceleration, when compared with a valve not having the damping mechanism. The 45° angle, however, is not critical and may be increased or decreased to suit any particular needs that may arise especially where it is desired to utilize more or less of the polar inertia.

It should be noted that in addition to acting as a means of reducing the amplitude of vibration, utilizing the polar moment of inertia of the member 54 also serves to reduce the natural or resonant frequency of the system. This feature may be utilized when desired to bring a natural period of resonance out of the range of critical vibration at some engine speed.

It should also be noted that while the valve modified in accordance with the present invention still has a resonant frequency band the resonant portion because of the damping is much less pronounced and is spread over a greater band of frequencies and the amplitude within that band is greatly reduced for the same vibration acceleration.

When it is desired to actuate the valve and force movable member 34 off its seat a switch 68 may be closed either manually or automatically to energize the solenoid 56. The magnetic force of solenoid 56 will draw flange 54 toward the solenoid, to the right as viewed in the figure, thus moving projection 46 toward the ball 34. The impact in the spline member 62 will take place as described above but there will be only the single impact. The friction in the spline will also tend to resist movement of the plunger 40 but as the acceleration induced by the solenoid is less than the vibration acceleration the friction associated with solenoid action will not be as great and once the parts have started to move the friction will be somewhat reduced. The inertia of the disc 54 will oppose the longitudinal movement of the plunger 40 and as the plunger is moved under the pull of the solenoid 56 energy will be stored in the flange 54 which will be returned to the plunger 40 when the plunger 46 strikes the ball 34. Hence as far as solenoid actuation is concerned the motion is slow and continuous in one direction as compared with the rapid and reversing motion of vibration and although the friction in the splines is the major loss, this loss is very slight when compared with the pull or energy of the solenoid. Hence it has been found that the same solenoid which actuated the valve before the addition of the spline member 62 is still sufficient to actuate the plunger after the installation of the spline member 62. However the amplitude of the vibration induced movement of the plunger 40 is greatly reduced.

While only a single embodiment has been disclosed, it will be apparent that various changes and modifications can be made in the construction and arrangement of the various parts without departing from the scope of this novel concept as defined in the subjoined claims.

We claim:

1. A valve comprising, a casing, a movable valve element, means for urging said valve element to closed position against a seat in said casing, a separate plunger mounted in said casing and movable axially into contact with said valve element to move said valve element off said seat and open said valve, a stop carried by said casing, means resiliently urging said separate plunger away from said valve element and against said stop, a helical spline connection between said plunger and said casing rotating said plunger upon relative axial movement of said plunger and casing, said helical connection having means providing a limited amount of lost motion, and means for moving said plunger axially including a flanged member attached to said plunger.

2. A valve subject to vibration comprising a casing, a movable valve element in said casing, means urging said element toward closed position, a separate valve tappet supported by said casing and comprising a plunger, a stop carried by said casing, resilient means urging said plunger away from and out of contact with said movable element and into contact with said stop carried by said casing, means for moving said tappet into contact with said movable element to open said valve, means for reducing vibration induced movement of said plunger relative to said casing comprising means transforming relative longitudinal movement of said plunger and casing into rotational movement of said plunger, and including means increasing the frictional drag of said plunger with increasing vibration accelerations.

3. A valve subject to vibration comprising a movable valve element, means yieldably forcing said element to closed position, a valve tappet comprising an elongated plunger, resilient means urging said tappet away from said element, said resilient means and plunger having a resonant frequency band and subject to longitudinal movement toward said element when subjected to vibration particularly within said resonant frequency band, and means for damping said vibration induced movement including a casing supporting said plunger and said valve element and through which vibration induced forces are transmitted to said plunger, means connecting said casing and said plunger for imparting rotary movement to said plunger upon relative axial movement of said plunger and casing, said connecting means including relatively sliding friction producing surfaces and means for forcing said surfaces together with a force varying with the vibration acceleration.

4. In combination, a casing subject to vibration, a movable valve element in said casing, a seat in said casing, a spring urging said valve element to closed position onto said seat, a valve actuating plunger reciprocably mounted in said casing, electrical means for moving said plunger axially to move said valve element off said seat, a flange on said plunger co-operating with said electrical means, a stop in said casing, spring means urging said plunger against said stop and away from said movable element, a helically splined member carried by said plunger and a mating helically splined member carried by said casing, for damping vibration of said plunger and imparting rotational movement to said plunger and flange upon axial reciprocation of said plunger.

5. A valve comprising a casing, a movable valve element, means urging said valve element to closed position against a seat in said casing, a separate plunger mounted in said casing and movable axially from a position out of contact with said valve element into a position in contact with said valve element to move said valve element off said seat and open said valve, a stop carried by said casing, means resiliently urging said plunger away from and into spaced relation with respect to said valve element and against said stop, a helical spline connection between said plunger and said casing rotating said plunger upon relative axial movement of said plunger and casing, and means for moving said plunger axially including a flanged member attached to said plunger, said plunger and flange having a substantial polar moment of inertia increasing the total inertial kinetic energy associated with velocity of said plunger relative to said casing.

6. A valve subject to vibration comprising a casing, a movable valve element in said casing, means urging said element toward closed position, a separate valve tappet supported by said casing and comprising a plunger, a stop carried by said casing, resilient means urging said plunger into spaced relation with and away from said movable element and into contact with said stop carried by said casing, means for moving said tappet from a position out of contact with said movable element to a position into contact with said movable element to open said valve, means for reducing vibration induced movement of said plunger relative to said casing comprising means increasing the net inertially induced forces opposing motion of said plunger away from said stop when subjected to axial vibratory acceleration including means transforming relative longitudinal movement of said plunger and casing into rotational movement of said plunger.

References Cited in the file of this patent

UNITED STATES PATENTS

| | | |
|---|---|---|
| 38,269 | Osgood | Apr. 21, 1863 |
| 951,318 | Kjerulff | Mar. 8, 1910 |
| 1,156,941 | Stevens | Oct. 19, 1915 |
| 1,273,445 | Beckerleg | July 23, 1918 |
| 1,380,737 | Pelletier | June 7, 1921 |
| 1,456,743 | Szabo | May 29, 1923 |
| 2,443,464 | Leibing | June 15, 1948 |
| 2,637,338 | Troendle | May 5, 1953 |